(12) United States Patent
Zhao et al.

(10) Patent No.: US 9,955,221 B2
(45) Date of Patent: Apr. 24, 2018

(54) DEVICE AND METHOD FOR FILM DISTRIBUTION AND WATCHING

(71) Applicant: Xuebo Zhao, Beijing (CN)

(72) Inventors: Xuebo Zhao, Beijing (CN); Lun Zhao, Beijing (CN)

( * ) Notice: Subject to any disclaimer, the term of this patent is extended or adjusted under 35 U.S.C. 154(b) by 314 days.

(21) Appl. No.: 14/659,626

(22) Filed: Mar. 17, 2015

(65) Prior Publication Data

US 2016/0277797 A1    Sep. 22, 2016

(51) Int. Cl.

| H04N 21/4627 | (2011.01) |
|---|---|
| H04N 21/254 | (2011.01) |
| H04N 21/2543 | (2011.01) |
| H04N 21/475 | (2011.01) |
| H04N 21/414 | (2011.01) |
| G02B 27/01 | (2006.01) |
| H04N 13/04 | (2006.01) |
| H04N 5/64 | (2006.01) |

(52) U.S. Cl.
CPC ....... *H04N 21/4627* (2013.01); *G02B 27/017* (2013.01); *G02B 27/0176* (2013.01); *H04N 13/044* (2013.01); *H04N 21/2541* (2013.01); *H04N 21/2543* (2013.01); *H04N 21/414* (2013.01); *H04N 21/41407* (2013.01); *H04N 21/4753* (2013.01); *H04N 5/64* (2013.01)

(58) Field of Classification Search
CPC .......... H04N 21/4627; H04N 21/2541; H04N 21/2543; H04N 21/4753; H04N 21/414; H04N 21/41407
See application file for complete search history.

(56) References Cited

FOREIGN PATENT DOCUMENTS

| CN | 102854984 A | 1/2013 |
|---|---|---|
| CN | 103149690 A | 6/2013 |
| CN | 104093040 A | 10/2014 |

*Primary Examiner* — Yassin Alata
(74) *Attorney, Agent, or Firm* — Buchanan Ingersoll & Rooney PC

(57) ABSTRACT

The present invention relates to a method of digital film distribution and watching based on an online eye screen. A film distributor distributes film data and film broadcasting rights to a user. The user watches a film based on the film data and the film broadcasting right from the film distributor through the online eye screen. The online eye screen is a wearable display device. The present invention allows film distributors to distribute films to individuals directly, and better control the number of users per distribution right granted, and decreases the cost of film distribution. The present invention decreases piracy and infringement of films because the invention increases the difficulty of unauthorized video recording. The present invention also improves the user's visual effect and viewing experience by filtering the scene outside. The present invention allows user to watch films anywhere and at any time.

7 Claims, 3 Drawing Sheets

DEVICE AND METHOD FOR FILM DISTRIBUTION AND WATCHING

FIELD OF THE INVENTION

The present invention relates to film distribution and watching method based on an online eye screen. Movie viewers can obtain permission and/or data of films from film distributors directly, so that viewers can watch films anywhere and at any time.

BACKGROUND OF THE INVENTION

The cinema is a traditional film showing place. Cinema operators buy permissions and reels of films from film distributors, and release screen schedules to the public.

Cinemas show a specific film at a specific time according to a predetermined screen schedule. Movie viewers then watch films in a cinema with a movie ticket.

Generally, a plurality of cinemas and corresponding film distributors work with a theater chain to standardize the film schedule. In the first showing period, film distributors distribute films to cinemas only, which is the only way for customers to watch a new movie. One issue with the above method is that customers can watch films only in cinemas rather than anywhere and at any time. A second issue is that the customer can only watch specific films at certain corresponding times. It's very difficult for a customer to watch a film after the first showing period. In some instances it is not convenient or even possible for customers living in remote regions to go to cinemas.

After the first showing period, some films will have a second showing period on the internet. Video platforms add the film data into their server after gaining the necessary permissions from broadcasters. A user watches films via online streaming directly or after downloading the film through visiting video platforms' servers via mobile phones, computers or any number of other network terminals. However, the visual effects and viewing experience on a network terminal is far inferior to the visual effects and viewing experience in a cinema. At the same time, network terminals are capable of showing a movie to multiple people simultaneously by using large-size screen monitors. In this case, video platforms cannot figure out the number of people actually watching a film even if the total number of times a film was played can be exactly calculated. Thus, film distributors cannot record and count the number of people who are actually watching a particular movie. Further, illegal copying is also uncontrollable. In above two cases, the interests of the film distributors are damaged.

SUMMARY OF THE INVENTION

A digital film distribution and watching method based on an online eye screen of the present invention overcomes the issues stated above.

One objective of the present invention is to allow people to watch films anywhere and at any time. For example, people living in remote regions which have no cinema can also watch films conveniently.

Another objective of the present invention is to filter the scene outside the screen, which greatly improves the visual effect and viewing experience of watching films.

Another objective of the present invention is to control and calculate the number of people that have watched a film. Film distributors are able to charge according to the number of people actually watching, which protects the interests of film distributors. The present invention also increases the enthusiasm of film distributors to distribute films online simultaneously as the first showing period while the film is still in theaters. The wide coverage of online film distribution attracts more users and greatly decreases the cost of film distribution.

Another objective of the present invention is to decrease piracy and infringement of films by increasing the difficulty of video recording.

DETAIL DESCRIPTION OF THE INVENTION

Figure 1:
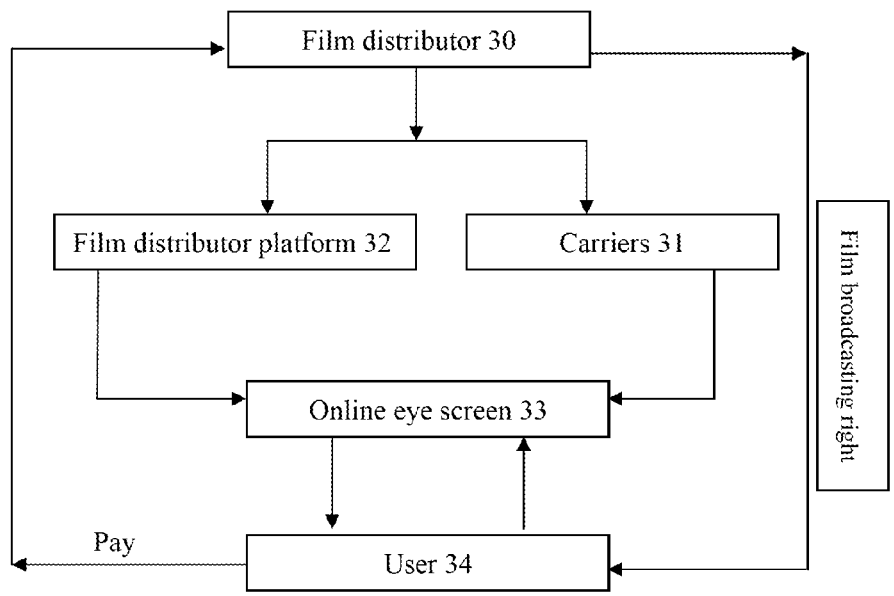
FIG. 1 is a flow diagram of the invention.

FIG. 1 shows a digital film distribution and watching method based on an online eye screen. In FIG. 1, film distributor 30 distributes film data and film broadcasting rights to user 34, wherein said film broadcasting right is the right of broadcasting films through online eye screen 33. User 34 watches a film based on the film data and the film broadcasting rights from film distributor 30 through online eye screen 33. Online eye screen 33 is a wearable display device, wherein online eye screen 33 comprises a bracket which fits to a human's head. The bracket is equipped with video display device, wherein video display device is equipped with a display system and two headsets 6. The display system comprises screen 23, wherein screen 23 is located at the front of bracket and faces user's eyes. Headsets 6 are located at the left and right sides of the bracket respectively which face user's corresponding ears.

Film distributor 30 distributes film data and film broadcasting rights to customer 34 through multiple ways.

For example, film distributor 30 distributes carriers 31 (i.e. USB flash disk or mobile HDD) stored with film data. User 34 plays the films by connecting carriers 31 to online eye screen 33. Film broadcasting rights, can be acquiescent, namely carriers 31 can distribute the right of broadcasting for the corresponding film. The film broadcasting right can also be ostensive, for example, user 34 needs to input codes predetermined and set by film distributor 30, wherein codes can be recorded on cards which are distributed with carriers 31 by film distributor 30 at the same time. In this case, even if carries 31 are held illegally, films are still unable to be played without codes.

Playing times and/or playing periods of films can be limited by existing technology on carriers. For example, a film is limited to be played a certain number of times like one time, three times or any other number of times. A film can also be limited to be played within a period of time like two days, three days or any other time after the first play. Film data will be locked or destroyed if playing times or the playing period exceeds the predetermined limits. In this case, users are not able to broadcast the film endlessly with a single purchase, which protects the interests of film distributor 30. At the same time, film data is technically designed to be read only by online eye screen 33, namely, films are not able to be played by any other devices, so that illegitimate replication of film data is avoided.

As another example, film distributor 30 distributes film data and film broadcasting rights through film distributor platform 32. User 34 downloads film data to local-storage device so that user 34 can watch films whenever they want. Film data and film broadcasting right can be distributed simultaneously or separately. For example, film data is available through downloading from film distributor platform 32 at any time by anyone, however, the film can be played only if user 34 obtains the film's broadcasting right. There exist several methods to get film broadcasting rights. For example, user 34 receives a message after paying for a film online, wherein the message with a code is sent to user's mobile phone which is used to pay the fee. Only if the code of film is input into online eye screen 33, can the film be played. In another situation, online eye screen 33 with network communication functionality downloads codes or any other control data directly to play films. In another situation, User 34 is required to pay first, then user 34 can download and watch films.

Multiple terminals can be used to download film data from film distributor platform 32, like PC, mobile phones or any other terminals, to make fill use of network communication capability of existing facilities. In this situation, online eye screen 33 only requires film display capability rather than powerful network communication capability, which simplifies the configuration of online eye screen 33. User 34 can watch films online by online eye screen 33 through connecting to film distributor platform 32 if necessary, wherein online eye screen 33 has network communication capability and is qualified for network communication. In another case, user 34 connects online eye screen 33 to communication facilities with corresponding communication capabilities (like mobile phones) to connect to film distributor platform 32. Communication facilities obtain film data from film distributor platform 32 and transfer film data to online eye screen 33. Thus, customer 34 can watch films on online eye screen 33.

One or several of the multiple ways of film distributing stated above can be selected to be put into effect.

To control film broadcasting rights, film distributor 30 can associate film broadcasting right with particular online eye screens, namely, films are limited to be played on said online screens only. Film distributor 30 can also decide whether to limit playing times and/or playing period. When a download/play program is running, film distributor platform 32 checks the identification code of online eye screen 33 at first. If the identification code of online eye screen 33 corresponds with the identification code stored in film distributor platform 32, film transmission continues. If the identification code of online eye screen 33 does not correspond with the identification codes stored in film distributor platform 32, film transmission will be terminated. In this case, even if film data and film broadcasting rights (code or any other data to control the film data) are copied illegally, the corresponding films cannot be played on other devices. The said identification code can adopt physical identification code included into online eye screen 33 or registration number which is set by user 34 and stored in online eye screen 33.

In a preferred embodiment, film distributor platform 32 stores a user list (user database). The user list includes user information and identification codes of online eye screens 33 which are bound to corresponding users. User 34 (viewer) registers information of user 34 through visiting film distributor platform 32. After film distributor platform 32 checks the information of user 34 automatically or manually, user 34 becomes a registered user of corresponding distributor 30. Online eye screen 33 has mobile communication capability and web-surfing capability. Web-surfing means that online eye screen 33 can access the internet and perform functions such as searching and accessing different web sites. Online eye screen 33 is set with an identification code which is able to be visited and identified by film distributor platform 32. Identification code of online eye screen 33 is unique, for example identification code can be IMEI (International Mobile Equipment Identification Number) or MEID (Mobile Equipment Identifier). A specialized identification code can also be set for online eye screen 33. The specialized identification code is distributed globally in a unified way and recorded in online eye screen 33 by equipment manufacturers, wherein the specialized identification code is unchangeable. Each national government can set corresponding administrative privileges according to conditions, laws, bilateral trade agreements and multilateral trade agreement of the country. Distributor 30 distributes film data and film broadcasting rights through film distributor platform 32. User 34 visits film distributor platform 32 through a special online eye screen and sends a request for downloading film data to play online or store in local-storage. Film distributor platform 32 acquires the identification code of online eye screen 33 and checks the user list to obtain the user's registration information bound with the identification code. Film distributor platform 32 charges according to charge mode which film distributor 30 and user 34 previously have an agreement on.

In free mode, film distributor platform 32 selects to set several conditions to gain the said film broadcasting right for free. If film distributor platform 32 selects to set no condition for users to gain said film broadcasting right for free, film distributor platform 32 sends film data to any online eye screen which requests for film data. If film distributor platform 32 sets a plurality of conditions (for example, online eye screen which requests for film data for first time, online eye screen in a specific area or online eye screen used by an identified free user) to gain said film broadcasting right for free, online eye screen 33 sends a request to film distributor platform 32. Before and/or during the process of transferring film data, film distributor platform 32 verifies whether online eye screen 33 matches the set conditions. If online eye screen 33 matches the set conditions, film distributor platform 32 starts to transfer film data and/or continues to transfer film data to online eye screen 33. If online eye screen 33 does not match the set conditions, film distributor platform 32 does not transfer film data to online eye screen 33 and/or stops transferring film data to online eye screen 33.

In paid mode, any one or more ways below can be used to pay the film broadcasting rights.

(1) User 34 purchases the film broadcasting rights and gains the film data through online eye screen 33 or any other terminals. In the process of requesting for transferring film data, online eye screen 33 sends the film broadcasting rights data to film distributor platform 32. Film distributor platform 32 compares the film broadcasting rights data received from online eye screen 33 with film broadcasting rights data (real or legal film broadcasting rights data) stored in film distributor platform 32. Film distributor platform 32 identifies whether the film broadcasting rights data of online eye screen 33 are real based on the comparison. If the film broadcasting rights are identified, film data transmission is continued. If the film broadcasting right are not identified, film data transmission is terminated.

(2) User 34 uses online eye screen 33 to pay film distributor platform 32 and gains the film broadcasting rights. Film distributor platform 32 reads identification codes of online eye screen 33 or receives external input identification data automatically (i.e. identification data can be identification codes of online eye screen 33 or any other forms of identification data). Film distributor platform 32 records the identification codes or the external input identification data into a data base of corresponding online eye screens which have gained corresponding film broadcasting rights. When film distributor platform 32 receives a request for film data from online eye screen 33, film distributor platform 32 reads the identification code or the identification data of online eye screen 33 automatically. Film distributor platform 32 compares the identification code or the identification data of online eye screen 33 with the identification codes or the identification data stored in the data base of online eye screens which have gained the corresponding film broadcasting rights. Film distributor platform 32 verifies whether the online eye screen is in the data base based on the comparison. If the online eye screen is in the data base, film data transmission is continued. If the online eye screen is not in the data base, film data transmission is terminated.

(3) User 34 purchases film broadcasting rights and input identification data of online eye screen 33 on film distributor platform 32 through online eye screen 33 or any other terminals. Film distributor platform 32 records the identification data into the data base of online eye screens which have gained the corresponding film broadcasting rights. When film distributor platform 32 receives a request for film data from online eye screen 33, film distributor platform 32 reads the identification code or the identification data of online eye screen 33 automatically. Film distributor platform 32 compares the identification code or the identification data of online eye screen 33 with the identification code or the identification data stored in the data base of the online eye screens which have gained the corresponding film broadcasting rights. Film distributor platform 32 verifies whether online eye screen 33 is in the data base based on the comparison. If the online eye screen is in the data base, film data transmission is continued. If the online eye screen is not in the data base, film data transmission is terminated.

(4) When user 34 becomes a registered user, the corresponding film broadcasting rights are gained in a pre-paid mode. When film distributor platform 32 receives a request for film data from online eye screen 33, film distributor platform 32 recognizes the registered user associated with the online eye screen 33 is a pre-paid user and checks the account balance of the user. If the account balance is enough to pay for a film broadcasting right, film distributor platform 32 transfers film data to online eye screen 33, and deducts the corresponding fee for the corresponding broadcasting right from the account balance of the registered user. If the account balance is not enough to pay for the film broadcasting right, film distributor platform 32 sends out a message to online eye screen 33 to remind the user the account balance is not enough to pay for the film broadcasting right and does not transfer film data to online eye screen 33.

(5) When user 34 becomes a registered user, the corresponding broadcasting rights are gained in a post-paid mode. When film distributor platform 32 receives a request for film data from online eye screen 33, film distributor platform 32 recognizes the registered user associated with the online eye screen 33 is a post-paid user. If user 34 matches conditions set by film distributor 30 or if there is no condition, film distributor platform 32 transfers film data to online eye screen 33 and records the cost of the film into user's post-paid account. Preferably, user's account is bound with the user's personal bank account. User 34, film distributor platform 32, a bank (if necessary) and other corresponding relevant parties reach an agreement. When user 34 is registering on film distributor platform 32 or when user 34 has successfully registered on film distributor platform 32, user 34 inputs the personal bank account information at the same time. User 34 authorizes film distributor platform 32 to transfer related expenses from user's personal bank account. Film distributor platform 32 records the information of user's personal bank account. After online eye screen 33 receives film data, film distributor platform 32 sends the price of the film broadcasting right to a bank computer system. Film distributor platform 32 sends a request to the bank computer system to transfer the charge from user's personal bank account. The bank computer system verifies the request and transfers the charge from user's personal bank account to the bank account of film distributor platform 32.

User 34 visits film distributor platform 32 through a special online eye screen and sends a request to film distributor platform 32 for transferring film data. Film distributor platform 32 reads the identification code of online eye screen 33 and checks the user list to obtain the user's information bound with the identification code automatically. Film distributor platform 32 charges according to charge mode recorded in the user list. In a pre-paid mode, film distributor platform 32 checks account balance of user 34. If the account balance is enough for a film, film distributor platform 32 transfers film data to online eye screen 33. If the account balance is not enough for a film, film distributor platform 32 sends out a message to online eye screen 33 to remind the user the account balance is not enough to pay for the film and does not transfer film data to online eye screen 33. In a post-paid mode, if user 34 matches conditions set by film distributor 30 or if there is no qualification, film distributor platform 32 transfers film data to online eye screen 33 and records the cost of the film into user's post-paid account. If user 34 does not match the conditions, film distributor platform 32 sends a message to online eye screen 33 to remind that user 34 does not match the conditions, and does not transfer film data to online eye screen 33.

When film distributor platform 32 is transferring film data to online eye screen 33, film distributor platform 32 inserts control data several times at random or according to a pre-determined way. Control data are verification procedures which can be identified by online eye screen 33. In the process of playing a film, online eye screen 33 reads the control data and compares the identification code in the control data with the identification code of online eye screen 33. If the identification code in the control data is the same with the identification code of online eye screen 33, online eye screen 33 continues playing the film and sends the actual playing information at the insert location to film distributor platform 32. If the identification code in the control data is different with the identification code of online eye screen 33, online eye screen 33 stops playing the film automatically. Then online eye screen 33 sends the playing information to film distributor platform 32. Film distributor platform 32 records the number of play times according to the playing information received from online eye screen 33, and charges if necessary. Through the way stated above, downloaded film can only be played on a specific online eye screen 33. Film distributor platform 32 is able to record each playing time. As a result, even if the film data is copied illegally, the film is unable to be played on other devices.

Preferably, online eye screen 33 includes sensor 41 which is used to capture signals of human body. Online eye screen 33 locks the function of playing films under normal condition (online eye screen 33 has not captured signals of human body), or online eye screen 33 locks the function of playing after playing for a specific period under normal condition. If the function of playing is locked as online eye screen 33 has not captured signals of human body, when sensor 41 captures a signal of human body, online eye screen 33 unlocks the function of playing films. If online eye screen 33 is playing a film, when sensor 41 captures a signal of human body, the function of playing will not be locked. User 34 is able to schedule viewing time freely, for example, user 34 can stop viewing halfway or schedule time to play a film according to the time and place. In this case, online eye screen 33 plays films only when online eye screen 33 is wore by person.

In order to increase the convenience of operation, online eye screen 33 unlocks the function of playing films for a specific period (i.e. 5 min or 10 min) when online eye screen 33 is playing a film. If online eye screen 33 has not captured signals of human body for the specific period, online eye screen 33 locks the function of playing.

Online eye screen 33 is a wearable digital film display device that fits the human body. Online eye screen 33 is selected to be equipped with network communication circuits (wireless communication circuits).

Figure 2:
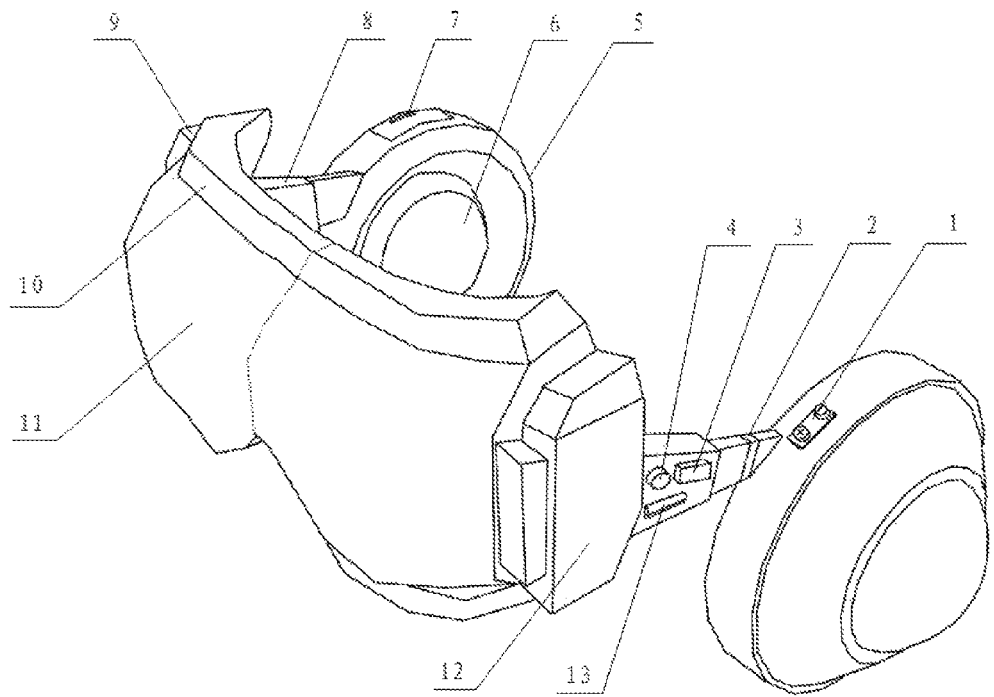
FIG. 2 is a three-dimensional structure schematic of an online eye screen.
Figure 3:
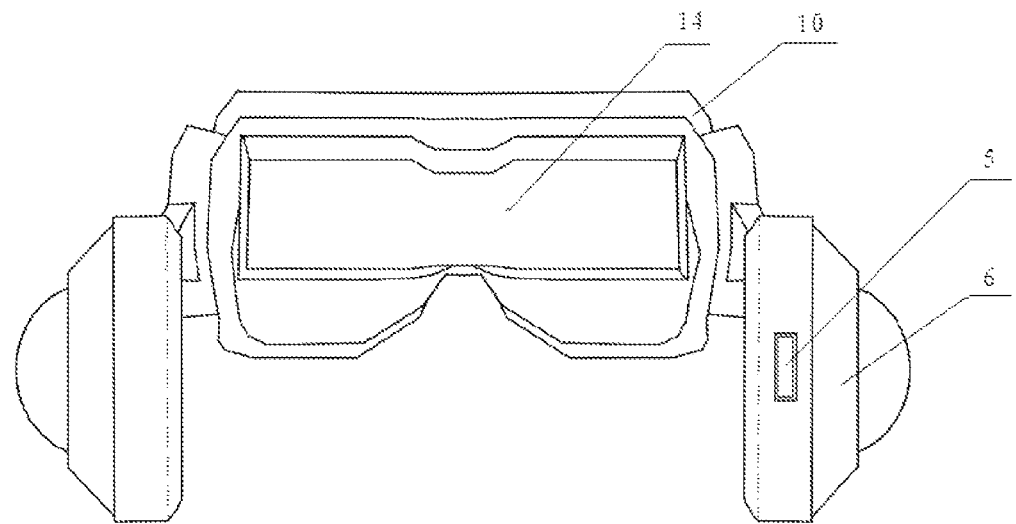
FIG. 3 is a front view of the online eye screen of FIG. 2
Figure 4:
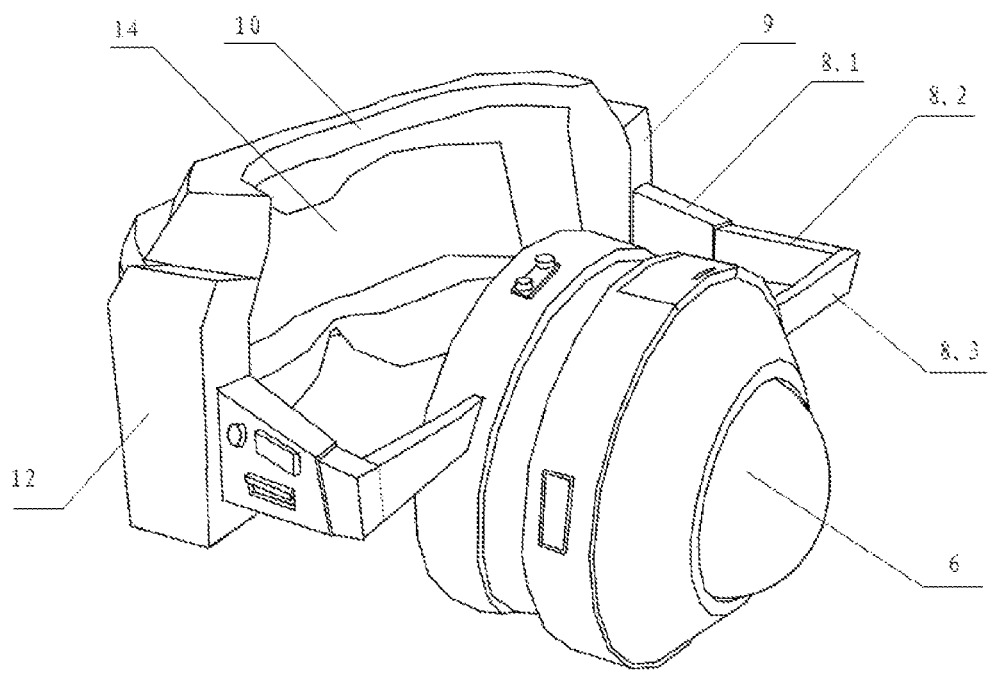
FIG. 4 is a structure schematic of the fold state of the online eye screen of FIG. 2
Figure 5:
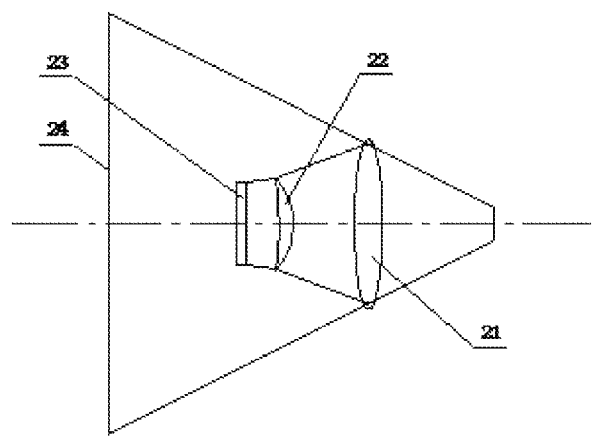
FIG. 5 is a light path diagram in an online eye screen.
Figure 6:
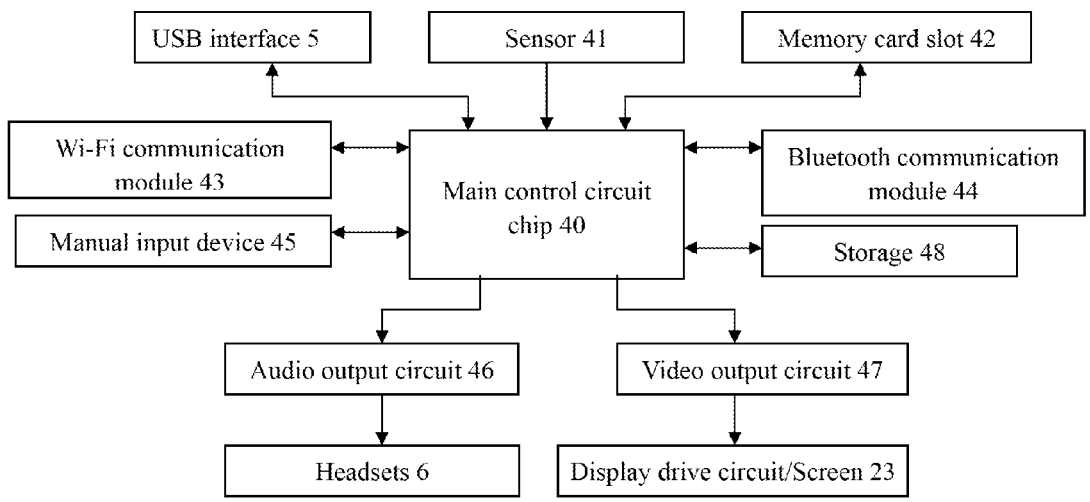
FIG. 6 is the block diagram of an electric circuit of an online eye screen.

FIG. 2-FIG. 4 show a preferred embodiment of online eye screen 33. An online eye screen includes a bracket which is adapted to a human's head, wherein the bracket is equipped with a video display device. The said video display device includes a display system and headsets 6. The said display system includes screen 23, wherein screen 23 is located in the front of the bracket and faces the eyes of wearers. Headsets 6 include two headsets, namely the left headset and the right headset, wherein the left headset and the right headset are located at two sides of the bracket facing to two ears of wearers separately.

Preferably, the said display system is a 3D display system. Headsets 6 are stereo headsets.

Screen 23 is an LCD screen, wherein LCD screen is connected to an optical amplifying apparatus and is located on the outside of the optical amplifying apparatus (near to the user side).

The said bracket can use any form of head-wearing bracket, such as a head-mounted bracket.

The said bracket adopts a spectacle frame structure. The spectacle frame structure bracket comprises: pre-frame 10 and left and right spectacle legs 8. Wherein spectacle legs 8 are connected to pre-frame 10 by a hinge joint, a rigid joint or any other joints. The LCD screen and the optical amplifying apparatus are located at pre-frame 10 facing the user's eyes. Left and right headsets 6 are located at the end of left and right spectacle legs 8 separately, wherein left and right headsets 6 correspond to the user's left and right ears. Spectacle frame structure makes the said bracket more compact. The spectacle frame structure bracket is more convenient to wear and fits the human body in a more reasonable way.

Spectacle leg 8 composes forepart 8.1, midpiece 8.2 and posterior 8.3. The joint of spectacle leg 8 and pre-frame 10 is located in the front of forepart 8.1. Midpiece 8.2 is connected to forepart 8.1 by a flexible push-pull way, wherein midpiece 8.2 adopts maximum stretch limit structure which prevents midpiece 8.2 separating from forepart 8.1. The front end of posterior 8.3 is connected to the rear end of midpiece 8.2 by hinge (through hinge joint 2). Hinge joint 2 adopts maximum rotation limit structure which limits the maximum angle between midpiece 8.2 and posterior 8.3, wherein the maximum angle between midpiece 8.2 and posterior 8.3 is 180°. The above flexible connection allows left and right spectacle legs 8 to be folded with pre-frame 10 through different insertion depths or overlap lengths of forepart 8.1 and midpiece 8.2 of spectacle legs 8. One spectacle leg is closely attached to the other spectacle leg after being folded (FIG. 4), which makes it easier to fold though the headsets are a bit huge.

There are cavities within the borders 9&12 of two sides of pre-frame 10 and forepart 8.1, wherein the cavities are used to place and install electronic components, chips and some other components of video display device.

Front cover 11 and rear window 14 are located at front and back of pre-frame 10 separately, wherein front cover 11 and rear window 14 are used to protect the internal electrical and optical components.

The video display device comprises volume adjustment button 1, 2D/3D switch button 3, power button 4 and Wi-Fi on-off button 13, wherein users are able to adjust volume, change playing mode between 2D/3D and turn on or off Wi-Fi through the corresponding buttons stated above.

The video display device further comprises USB interface 5, wherein users are able to connect the video display device to mobile storage device, other video display devices, computer communication network, and so on.

The video display device further comprises signal receiving device 7, wherein signal receiving device 7 is used to receive various external signals.

Signal receiving device 7 comprises any one or several kinds of modules below: satellite signal receiving module, TV signal receiving module, Wi-Fi communication module 43 and bluetooth communication module 44, wherein signal receiving device 7 receives satellite signal and TV signal through corresponding signal receiving modules, or connects to other devices through Wi-Fi communication module 43 or bluetooth communication module 44.

The video display device further comprises main control circuit chip 40, wherein main control circuit chip 40 is the carrier of main control circuit. By using the chip, the structure of circuit is simplified. An easier way of installation and maintenance is achieved.

Suitably, the video display device further comprises a rechargeable battery. Users can charge the battery through USB line which is connected with video display device and the corresponding circuit in the video display device. The USB line serving as both a means of transmitting information and electrically charging the device is more convenient than both functions separately.

Suitably, main control circuit chip 40 and rechargeable battery are separately installed in the cavities located in the left and right borders 12&9 of pre-frame 10.

Suitably, 2D/3D switch button 3, power button 4 and Wi-Fi on-off button 13 are installed on the forepart of spectacle leg 8 which is located on the same side as the chip. Volume adjusting button 1 is installed on the border of headset 6, which is located at the same side with the chip. USB interface 5 and signal receiving device 7 are installed on the forepart of spectacle leg 8 and/or on the border of headsets 6, which is located at the same side with the rechargeable battery. In this case, inner circuit design is simplified and interruptions between lines are reduced.

Volume adjusting button 1, 2D/3D switch button 3, power button 4, USB interface 5. Wi-Fi on-off button 13 and signal receiving device 7 are all connected to main control circuit chip 40.

Main control circuit chip 40 is also connected with memory card slot 42, wherein main control circuit chip 40 obtains video files from various digital cards and flash cards through memory card slot 42.

Suitably, the shape of card slot varies.

Suitably, the card slot is installed on the said bracket.

Suitably, non-rechargeable battery is also installed on the said bracket, wherein non-rechargeable battery cooperates with rechargeable battery. Non-rechargeable battery is applied in the situation where charging is not available. In this way, the video display device runs well even when rechargeable battery runs out.

The number of LCD screen is one or two according to the adopted displaying ways.

Suitably, when there is only one LCD screen, only one optical amplifying apparatus is needed. The optical amplifying apparatus is located on the inner side of the LCD screen. Optical amplifying apparatus and LCD screen are installed on pre-frame 10, wherein the distance between the optical amplifying apparatus and LCD screen can be adjusted by a position adjusting device.

Suitably, when there are two LCD screens, namely, left LCD screen and right LCD screen. Two optical amplifying apparatuses are needed, namely, left amplifying apparatus and right amplifying apparatus. The left amplifying apparatus is located at the inner side of the left LCD screen and amplifies the image of the left LCD screen. Similarly, the right amplifying apparatus is located at the inner side of the right LCD screen and amplifies the image of the right LCD screen. Two LCD screens are used to adjust to any current common 3D module.

Left optical amplifying apparatus and left LCD screen are installed on the left frame. The right optical amplifying apparatus and the right LCD screen are installed on right frame. The distance between the left optical amplifying apparatus and the left LCD screen is adjusted by the left position adjusting device. The distance between the right optical amplifying apparatus and the right LCD screen is adjusted by right position adjusting device. Different users can adjust the distances according to their requirements. When there are one LCD screen and one optical amplifying apparatus, the active connection mode of the LCD screen and the optical amplifying apparatus and the position adjusting device can be set according to the way stated above.

Optical amplifying apparatus adopts any optical structure which is able to amplify images. Optical amplifying apparatus generally comprises objective lens 22 and eyepiece 21. Simplified optical structure like a single lens also can be used. The form of imaging is usually amplified virtual image 24.

Optical amplifying apparatus comprises one or more optical lenses. When optical amplifying apparatus has a plurality of optical lenses, optical lenses are installed on a support of the optical amplifying apparatus. There are some auxiliary adjusting devices installed on the support which can adjust the distances between different optical lenses. So that, adjusting the distances between optical lenses can meet requirements of different users.

Left LCD screen and left optical amplifying apparatus are installed on the left frame. Right LCD screen and right optical amplifying apparatus are installed on the right frame. Distance between left frame and right frame can be adjusted by the corresponding position adjusting device. The left frame is rotated relative to the pre-frame by left angle adjusting device, that is to say, rotated around the vertical line. The right frame is rotated relative to the pre-frame by a right angle adjusting device. Left frame and right frame are all installed on pre-frame 10. Distances and angles of left and right frames can be adjusted by corresponding position or angle adjusting devices. By adjusting the distance and angle of said devices, the video display device can meet requirements of different users.

Main control circuit chip 40 comprises manual input device 45 and storage 48. Manual input device 45 comprises adjusting buttons stated above and other buttons.

Main control circuit chip 40 further comprises audio output circuit 46 and video output circuit 47. Audio output circuit 46 is a dual track output circuit. Left and right headsets are separately connected to left and right track output circuit of dual track output circuit. Video output circuit 47 is a 3D video output circuit. Left and right LCD screens have their respective display drive circuits. Left and right LCD screens are separately connected with left or right 3D video output circuits. In this way, 3D stereo playing can be achieved.

There is a human body sensor located on the head-wearing bracket. A human body sensor is an infrared sensor (e.g. an infrared distance sensor or an infrared human body sensor) which can be installed on the bracket. When user 34 wears online eye screen 33, infrared sensor(s) approaching close to human's face receive sensing signals. Online eye screen 33 then unlocks the function of video playing and displays films. When user 34 takes off online eye screen 33, infrared sensor gets away from human's face and cannot detect human's signals. If online eye screen 33 has not captured signals of human body for a specific period set by the user, online eye screen 33 then locks the function of video playing.

The active connection types involved in present invention are based on existing technologies. For example, a relative linear movement (including the push-pull way stated above) is achieved by a guide rail, a guide rail slot and other support structures. Devices connected with the guide rail move along the guide rail slot, thus distance between devices can be adjusted. Adjusting devices such as screw and nut, rack and pinion and conveyor belt can be used to realize the relative linear movement.

A relative rotational motion is achieved by fastening one device on the shaft into the other device using bearing(s).

Related limit structures also use existing technologies. For example, baffle or blocks set on the motion curve (end point or limit point) of device can limit the motion of device. When two devices are required to achieve both relative spinning motion and relative linear movement, a middle connector is needed. One device first connects with middle connector through a spin connection. Then a middle connector connects with the other device through a linear connection. In this case, two devices are connected with each other in such a way that relative linear movement and relative spinning motion can be achieved. When a first part is fixed to a third part and a second part is movably connected to the third part, that means the second part is movably connected to the first part. The back and forth motion, left and right motion stated in present invention are all linear motions in corresponding directions.

Each of measures stated in the present invention can be combined freely except as stated otherwise to form different embodiments to meet different requirements.

The invention claimed is:

1. A method of film distribution and watching based on a film distribution platform, the film distribution platform comprising:

an eye screen, wherein the eye screen is connected to the film distribution platform through a communication network;
wherein the eye screen is a wearable display device comprising:
a head-wearing bracket;
a video display device located on the head-wearing bracket; and
the video display device comprising:
a display system and two headsets;
the display system further comprises a screen located at a front of a bracket facing a user's eyes;
a left headset and a right headset located at left and right sides of the bracket respectively and facing corresponding ears of the user;
an identification code unique to each specific eye screen;
the method comprising:
transferring film data from the film distribution platform to the eye screen after receiving a request sent by the eye screen to play the film data on the eye screen or store the film data in a local storage device;
verifying whether the eye screen accords with conditions for obtaining broadcasting rights of related films for free or not before transferring the film data during transmission;
not transferring or stopping transferring the film data if the eye screen does not accord with the conditions for obtaining the broadcasting rights of related films for free or not;
inserting control data several times and comparing an identification code in the control data with the identification code of the eye screen during a playing of the film;
continuing to play the film if the identification code in the control data is the same as the identification code of the eye screen;
stopping to play the film automatically if the identification code in the control data is different from the identification code of the eye screen;
recording playing information including playing times received from the eye screen and charging users if the user needs to be charged;
connecting data of the film broadcasting right to the identification code of the eye screen;
finding the identification code of the eye screen and comparing the identification code of the eye screen with the identification code connected to the data of the film broadcasting right and continue the transmission of the film data if the two codes are the same; and
stopping the transmission if the identification code of the eye screen is different than the identification code connected to the data of the film broadcasting right.

2. The method of claim 1, wherein:
the film broadcasting right is free or purchasable from a film distributor;
if the film broadcasting right is free, the film distributor sets conditions;
if the film broadcasting right is purchasable, the film broadcasting right is paid for by a pre-paid mode, or a post-paid mode;
in the pre-paid mode, the user has an account balance;
in the post-paid mode, the user has a post-paid account;
the film data and the film broadcasting right are purchased through the eye screen or through another source;
the method further comprising:
recognizing that a user uses the pre-paid mode or the post-paid mode;
if in the pre-paid mode:
checking the account balance of the user and comparing to cost of a film;
deducting a corresponding amount of money and transferring the film data if the account balance is sufficient;
sending a message to the user if the account balance is not sufficient and discontinuing transfer of the film data;
if in the post-paid mode:
recording the cost of the film into the user's post-paid account;
following a user's purchase, receiving a request for the film data;
optionally, comparing the film broadcasting right of the eye screen with film broadcasting rights stored in the film distribution platform;
receiving the identification codes of the eye screen automatically or accepting the identification codes input by a user;
storing the identification code and identification data in a database;
upon receiving a request for transfer of the film data, comparing the identification code of the eye screen with the identification code stored in the database which have obtained the film broadcasting right.

3. The method of claim 2, further comprising:
setting a unique identification code for each eye screen;
storing a user list including a user's information bound to the identification code of the eye screen;
registering the user's information;
confirming the user's information and making the user a registered user, wherein a registered user accesses the film distributor platform through the eye screen.

4. The method of claim 3, the eye screen further comprising:
an infrared sensor located on the bracket;
wherein:
the infrared sensor is able to capture signals of a human body;
the eye screen is functionally locked as a default condition;
the eye screen unlocks if the infrared sensor captures signals of the human body;
the eye screen remains unlocked for a specific period when the eye screen is playing a film;
the eye screen locks if the infrared sensor has not captured signals for the specific period.

5. The method of claim 4, wherein:
the display system is a 2D/3D display system;
the screen is a left LCD screen and a right LCD screen and mounted on the bracket;
a left optical amplifying apparatus is located on an inner side of the left LCD screen;
a right optical amplifying apparatus is located on an inner side of the right LCD screen;
a distance between the left optical amplifying apparatus and the left LCD screen is adjusted by a left position adjusting device;
a distance between the right optical amplifying apparatus and the right LCD screen is adjusted by a right position adjusting device;
each of the left and right optical amplifying apparatuses comprises a plurality of optical lenses installed on a support;
a plurality of auxiliary adjusting devices are installed on each support and adjust distances between the plurality of optical lenses.

6. The method of claim 5, wherein:
the bracket is a spectacle frame structure and further comprises:
a pre-frame, a left spectacle leg, and a right spectacle leg; wherein:
the left spectacle leg and the right spectacle leg are connected to the pre-frame by a hinge joint, a rigid joint, or any other joint;
each of the left spectacle leg and the right spectacle leg comprises a forepart, a mid-piece, and a posterior;
at a front of each forepart is a joint connecting to the pre-frame;
a flexible push-pull way connects each forepart to the corresponding mid-piece;
each mid-piece has a maximum stretch limit preventing separation from the forepart;
an end of each posterior is connected to a front end of the corresponding mid-piece by a hinge with a maximum rotation limit structure limiting a maximum angle between each posterior and mid-piece;
cavities are formed within the pre-frame and each posterior.

7. The method of claim 6, wherein:
the headsets are stereo headsets;
the video display device further comprises:
a volume adjusting button
a 2D/3D switch button;
a power button;
a USB interface;
a Wi-Fi on-off button;
a signal receiving device;
a main control circuit chip;
a rechargeable battery;
wherein:
the main control circuit chip and the rechargeable battery are separately installed in cavities in a preframe;
the 2D/3D switch button, the power button, and the Wi-Fi on-off button are installed on the forepart connected to a side of the preframe closest to the main control circuit chip;
the USB interface and the signal receiving device are located installed adjacent to one of the headsets on the forepart;
the signal receiving device comprises a plurality of kinds of the following modules: a satellite signal receiving module, a TV signal receiving module, a Wi-Fi communication module and a Bluetooth communication module;
the volume adjusting button, the 2D/3D switch button, the power button, the Wi-Fi on-off button; the USB interface and the signal receiving device are connected to the main control circuit chip;
a memory card slot is installed on the bracket and connected to the main control circuit chip;
the main circuit control chip comprises a manual input device, a storage, an audio output circuit, and a video output circuit;
the audio output circuit is a dual track output circuit;
the video output circuit is a 3D video circuit;
each of the left LCD screen and the right LCD screen is provided with a display drive circuit and is separately connected with a left and right 3D video input circuit.

\* \* \* \* \*